(12) United States Patent
Bannert et al.

(10) Patent No.: US 10,963,296 B1
(45) Date of Patent: Mar. 30, 2021

(54) LOAD BALANCING OF COMPUTE RESOURCES BASED ON RESOURCE CREDITS

(71) Applicant: Amazon Technologies, Inc., Seattle, WA (US)

(72) Inventors: Aaron Graydon Bannert, Seattle, WA (US); Nitish Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 356 days.

(21) Appl. No.: 16/015,451

(22) Filed: Jun. 22, 2018

(51) Int. Cl.
*G06F 9/46* (2006.01)
*G06F 9/48* (2006.01)
*G06F 9/54* (2006.01)
*G06F 9/50* (2006.01)

(52) U.S. Cl.
CPC .......... *G06F 9/4881* (2013.01); *G06F 9/505* (2013.01); *G06F 9/543* (2013.01)

(58) Field of Classification Search
None
See application file for complete search history.

(56) References Cited

U.S. PATENT DOCUMENTS 8,869,164 B2 * 10/2014 Bobroff .................. G06F 9/505
   718/105
10,649,796 B2 * 5/2020 Phillips .................. G06F 9/505

* cited by examiner

*Primary Examiner* — Bing Zhao
(74) *Attorney, Agent, or Firm* — Nicholson De Vos Webster & Elliott LLP (57) ABSTRACT

Techniques for load balancing based on relative credit balances are described. For example, one embodiment of a method comprises: determining current credit balances for a plurality of compute instances; receiving a request; selecting one of the compute instances to be a destination for the request based on a comparison of the current credit balances; and transmitting the request to the selected compute instance.

18 Claims, 8 Drawing Sheets

LOAD BALANCING OF COMPUTE RESOURCES BASED ON RESOURCE CREDITS

BACKGROUND

Computer networks today are used to interconnect a variety of heterogeneous computing systems which provide the data processing, storage, and networking services required by organizations. These computing systems may be co-located (e.g., as part of a local network) or instead located in multiple distinct geographical locations (e.g., connected via one or more private or public intermediate networks). For example, data centers housing a significant number of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that include all of the hardware and software required by their customers. However, as the scale and scope of typical data centers has increased, the tasks of provisioning, administering, and managing the physical computing resources have become increasingly complicated.

Virtualization technologies are often used for managing large-scale computing resources for many customers with diverse needs, allowing different computing resources to be efficiently and securely shared by multiple customers. For example, virtualization technologies may allow a single physical computing machine to be shared among multiple customers by providing each customer with one or more virtual machines hosted by the single physical computing machine. Each such virtual machine is a software simulation acting as a distinct logical computing system that provides users with the illusion that they are the sole operators and administrators of a given hardware computing resource. Various security techniques are implemented to ensure application isolation among the various virtual machines. Furthermore, some virtualization technologies are capable of providing virtual resources that span two or more physical resources, such as a single virtual machine with multiple virtual processors that span multiple distinct physical computing systems. As another example, virtualization technologies allow data storage hardware to be shared among multiple users by providing each user with a virtualized data store distributed across one or multiple physical data storage devices. In such an implementation, each user is provided with limited access to only those virtualized portions of the physical data storage devices which are allocated to that user.

BRIEF DESCRIPTION OF DRAWINGS

Various embodiments in accordance with the present disclosure will be described with reference to the drawings, in which.

DETAILED DESCRIPTION

A credit-based load balancer is described which distributes compute requests across a plurality of compute resources, sometimes referred to as "instances." In one embodiment, the credit-based load balancer allocates credits to the instances, which consume the credits by processing the compute requests. The credits may be allocated to the compute resources periodically (e.g., with a fixed number of credits allocated every hour, day, week, etc.) and/or in accordance with a specified credit allocation policy. In one implementation, the credit-based load balancer selects instances to process compute requests based on the magnitude of the current credit balance allocated to each instance. For example, the credit-based load balancer may select instances with relatively higher credit balances ahead of instances with relatively lower credit balances, all other variables being equal.

In addition to the current credit balance, the credit-based load balancer may compile and evaluate trending data to determine if an instance is seeing an increasing or decreasing trend in its credit balance. The credit-based load balancer then uses this trending data when assigning workloads to that instance (e.g., reducing workloads for those instances with a downward trending credit balance). In this embodiment, the load balancer may analyze the last N minutes of data for each instance (e.g., 10 minutes, 20 minutes, etc.) and determine whether the credit balance is trending upwards or downwards (or remaining flat) and the rate of the upward or downward trend, respectively. The credit-based load balancer may then assign higher priority to instances which have an accelerated upward trending credit balance.

The credit-based load balancer may evaluate other forms of data relevant to the operation of each of the instances such as the current load on each of the instances and the current "health" of the instances. This data may be collected periodically from each of the instances and stored in a memory or storage device accessible by the credit-based load balancer.

The trending data and the credit balance data may be used alone or in combination with one another and/or any of the other forms of data (e.g., current load, health) to select instances. For example, the credit-based load balancer may choose the instance with the highest relative credit balance, unless the trending data for another instance (with a credit balance above a specified threshold) shows an accelerated increase in credit balance. Moreover, if the current workload on any instance is at a specified threshold, then it will not be selected, notwithstanding its credit balance and/or trending data. Similarly, if two compute instances have substantially similar credit balances which are trending upwards at a substantially similar rate, then the credit-based load balancer may select the compute instance with the lower current workload.

The described embodiments overcome problems realized by current load balancing systems. For example, in existing load balancing systems, if an instance is available, then it may be sent a compute request notwithstanding the size of its credit balance. There is no evaluation of the relative sizes of the credit balances of the instances nor is there an analysis of the credit balance trend (e.g., the speed at which the credit balance is changing). Consequently, a first instance may be starved for credits after recently processing substantial workloads (e.g., after being sent one or more "heavier" compute requests) while a second instance may have accumulated a large credit balance (e.g., as a result of being sent lightweight compute requests). If a request is subsequently sent to the first instance, a request that should only take 0.25 seconds to complete may now take 5 or 10 seconds, resulting in a degraded customer experience. In contrast, the embodiments described herein render more efficient, intelligent load balancing decisions based on current credit balances and credit balance trends, resulting in an improved customer experience.

Figure 1:
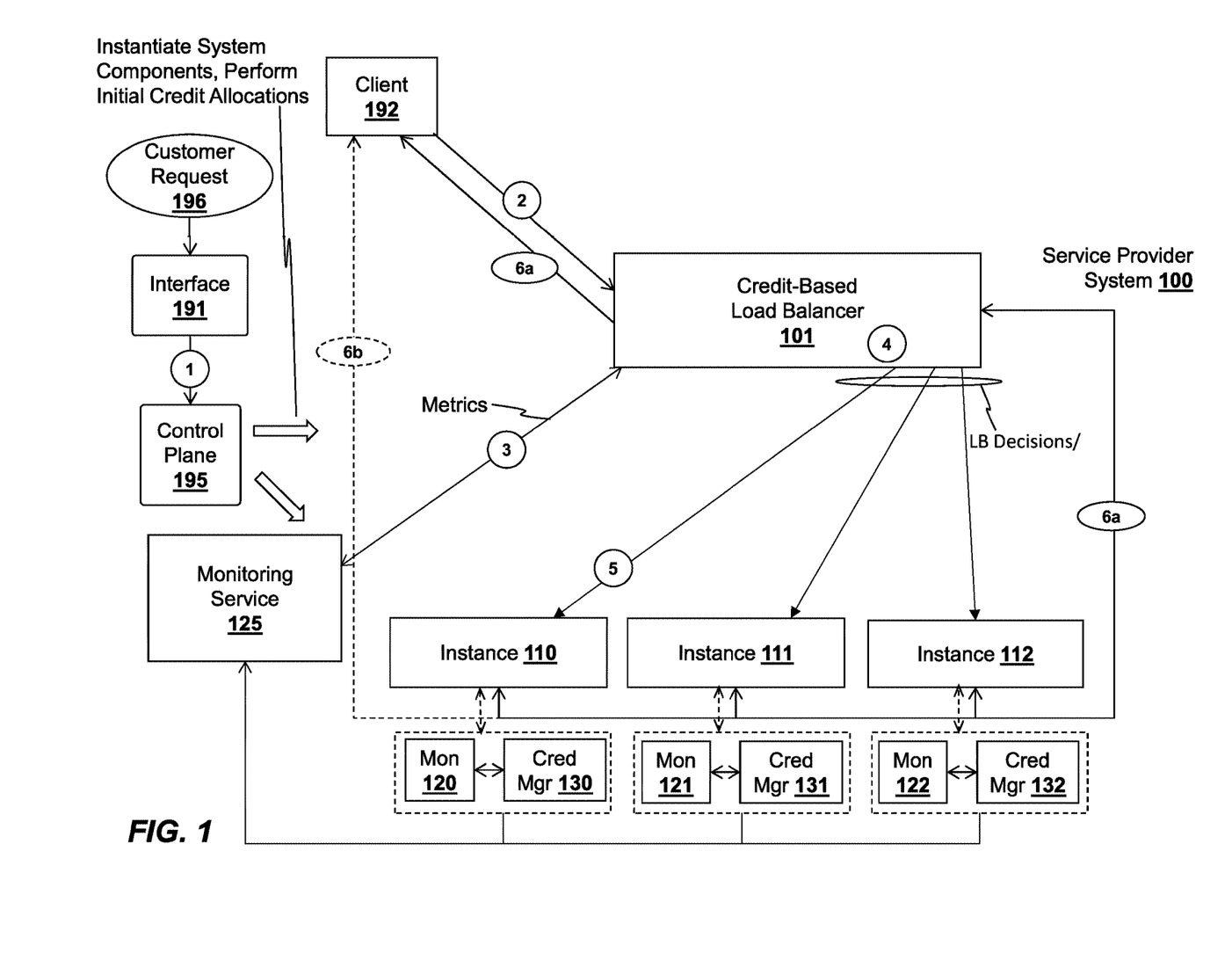
FIG. 1 is a block diagram illustrating a service provider system implementing a credit-based load balancer and compute instances.

Referring to FIG. 1, the service provider system 100 may utilize one or more of different types of instances 110-112 such as virtual machines (VMs) or other virtual computing arrangements, data/storage resources (e.g., object storage, block-level storage, data archival storage), networking resources (e.g., configuring virtual networks including compute resources, content delivery networks, Domain Name Service (DNS) systems, network address management systems), and application resources (e.g., databases, application build/deployment services), to name a few. The one or more instances 110-112 can be implemented using a single electronic server device or may be spread across multiple electronic server devices. Thus, a user may directly utilize a compute instance hosted by the service provider system to perform various computing tasks, or may indirectly utilize a compute instance running as a "back end" service on the service provider's network and executing code in response to requests from "front end" servers which are directly accessed by the user (e.g., without the user having any control of or knowledge of the underlying compute instance (s) involved). The underlying principles of the described embodiments are not limited to any particular implementation of compute instances.

For the sake of discussion, it will be assumed that the service provider system 100 utilizes virtualization techniques to provide its compute services to users/customers. In this embodiment, the plurality of instances 110-112 are compute instances which comprise virtually partitioned sets of computing resources such as CPUs and memory. The compute instances 110-112, for example, may include one or more virtual machines and/or guest operating systems (OSs) executed on a hypervisor or virtual machine monitor (VMM) (which may or may not operate on top of an underlying host OS), containers which may or may not operate within a VM, and/or compute software engineered with native program code for executing on "bare metal" hardware without an underlying hypervisor/VMM. The portion of the CPU allocated to a particular VM/OS is sometimes referred to herein as a "virtual CPU" or "vCPU".

As illustrated in FIG. 1, one embodiment of the load balancer 101 assigns compute requests originating from clients 192 to compute instances 110-112 based on current relative credit balances of the compute instances 110-112 (and/or other variables described herein such as credit trending data). The clients include external clients 192 such as users connecting to the service provider system over the Internet and internal clients (not shown) such as other services running within the service provider system 100 (e.g., front end servers such as Web servers or back end servers running business logic or other application program code which require access to the compute resources offered by the instances 110-112). Thus, the term "client" may refer to both traditional end-user devices such as personal computers, tablets, smartphones, and server-based software running within the service provider system 100 or coupled to the service provider system 100 via a public or private network.

In one embodiment, the client 192 submits compute requests to the credit-based load balancer 101 and the various instances 110-112 process the compute requests in accordance with current credit allocations, providing the compute results to the requesting client 192 (e.g., directly, or indirectly via the credit-based load balancer 101).

The credit-based load balancer 101 may be one of a plurality of credit-based load balancers within a distributed load balancing system. Alternatively, the credit-based load balancer 101 may comprise a centralized load balancer. The underlying principles of the described embodiments are not limited to any particular load balancing arrangement.

In one embodiment, a plurality of monitors 120-122 collect data processing metrics for each of the instances 110-112. The data processing metrics may include, for example, the number of credits consumed by each compute instance 110-112 during specified time intervals, the processing load on each of the compute instances 110-112 (e.g., as measured over a period of time such as 10 seconds, one minute, etc), and other data relevant to load balancing decisions (e.g., such as the "health" or reliability of each of the instances 110-112). In one embodiment, the monitors 120-122 transmit this data to a monitoring service 125 running on the service provider system. In general, the monitoring service 125 may receive, store, redistribute, and/or monitor data generated in the service provider system 100, such as metric data, log data, event data, etc. While in one embodiment the monitoring service 125 is the Cloudwatch service used to monitor EC2 instances, this specific implementation is not required.

In one virtualized environment, a hypervisor hosting each instance 110-112 periodically generates an event to communicate the credit balance of its instance to the monitoring service 125. The credit-based load balancer 101 then makes an API call to the monitoring service 125 to obtain the most recent credit balances (and potentially other monitored metrics) and stores them in its credit-based cache 200 (see FIGS. 2A and 2B). In one implementation, the credit-based load balancer 101 makes these API calls periodically to refresh the information in the credit-based cache 200.

Each instance 110-112 may include or be associated with a credit manager 130-132, respectively, to allocate credit to the instances 110-112 (e.g., upon initialization and periodically thereafter) and to adjust the current credit balance in response to compute operations performed by the instance. In one specific embodiment, a program running on the hypervisor hosting the virtual machine (VM) running on a virtual CPU (vCPU) tracks the number of credits consumed by the VM by monitoring the amount of time a VM runs on the vCPU. In another embodiment described below, the instances 110-112 transmit the data processing metrics with compute responses provided in-band to the credit-based load balancer 101 (e.g., in an embodiment in which compute responses are sent through the credit-based load balancer 101 rather than directly to the clients 192-193)

In one embodiment, operations (1)-(6) illustrated in FIG. 1 are implemented as follows. A customer 196 of a service provider system 100 uses an interface 191 (e.g., an API exposed by the service provider) to request a control plane service 195 of the service provider system 100 to instantiate a credit-based load balancer 101. For example, the customer may also have requested the instantiation of one or more instances 110-112 and for the credit-based load balancer 101 to balance requests to the instances. In addition, the control plane service 195 may allocate an initial credit balance to each of the instances 110-112 it instantiates. Accordingly, the control plane service 195 can instantiate instances 110-112 (including initial credit balances) and the credit-based load balancer 101 and configure the network interconnections between the instances 110-112 and the load balancer 101.

Subsequently, a client 192 makes a compute request (2) directed to the IP address of the credit-based load balancer 101 which is routed to the credit-based load balancer 101 over the substrate network of the service provider system 100. There may be multiple credit-based load balancers within service provider system 100 and the illustrated credit-based load balancer 101 may be instantiated on a physical server selected based on variables such as physical network proximity to servers hosting the instances 110-112 and/or a placement policy implemented within the service provider system 100.

As mentioned above, the monitors 120-122 transmit periodic data processing metrics to the monitoring service 125. In one embodiment, the credit-based load balancer 101 periodically retrieves the data processing metrics (3) from the monitoring service 125 for each instance 110-112 for which it is performing load balancing. In an alternate embodiment, the monitors 120-122 or the instances 110-112 themselves gather and transmit the data processing metrics directly to the credit-based load balancer 101. As described in greater detail below, the data processing metrics may include current credit balances, credit consumption data such as the credit usage of each instance 110-112 during specific time intervals, and data related to the health of each instance 110-112.

The credit-based load balancer 101 uses the collected data processing metrics to identify a particular instance 110 to process the client request (4) and then forwards the request (5) to the instance 110. After processing the request, the instance 110 transmits the results to client 192 via the credit-based load balancer 101 (6a). Alternatively, in one embodiment, the instance 110 transmits the results directly to the client 192 (6b).

Figure 2A:
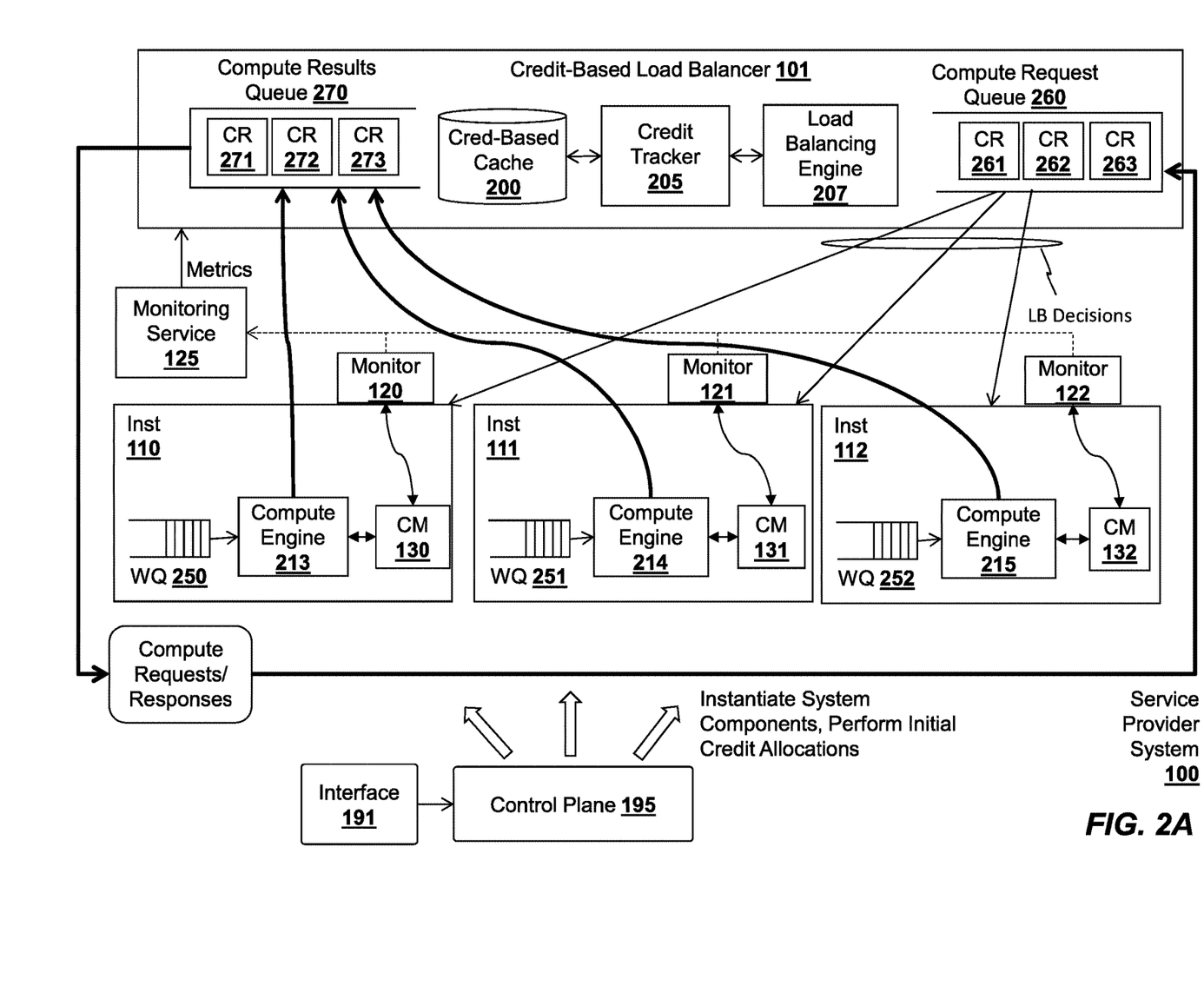
FIGS. 2A-B illustrate additional details for embodiments of a credit-based load balancer and compute instances.

FIG. 2A illustrates additional details of one embodiment. In particular, in FIG. 2A, each instance 110-112 includes a work queue 250-252, respectively, for queuing work to be performed by each respective compute engine 213-215. FIG. 2A also illustrates the credit managers 130-132 for adjusting the current credit balances of the instances 110-112 upon performing the work and monitors 120-122 for continually updating the monitoring service 125 with the current credit balance (and potentially other data processing metrics) for each instance 110-112, respectively. As mentioned, a monitoring service 125 such as the Cloudwatch service may periodically receive credit balance updates from the monitors 120-122 and report the credit balances to the credit-based load balancer 101 upon request. A credit tracker 205 of the credit-based load balancer 101 tracks the current credit balances of each instance 110-112, continually reading and writing credit balance data to a credit-based cache 200.

The work queues 250-252 may be implemented within designated memory regions of a high speed dynamic random access memory (DRAM) or other type of memory/storage device and may be configured as prioritized queues (e.g., where the compute engines 213-215 process work in accordance with relative priorities), first-in-first-out (FIFO) queues (e.g., in which older compute work is executed ahead of newer compute work), or some combination thereof (e.g., in which prioritization is used but compute requests which have been queued for a threshold length of time are executed first, regardless of priority). In the illustrated embodiment, a compute request queue 260 stores compute requests 261-263 pending assignment to a particular instance 110-112 and a compute results queue 270 stores compute results 271-273 generated by the compute instances pending transmission to one of the requesting clients (e.g., client 192 in the example).

As mentioned, the instances 110-112 of one embodiment process work based on a current credit balance. For example, credit managers 130-132 may track and allocate credit to the compute engines 213-215 which consume the credits when processing work from the work queues 250-252. In one embodiment in which the instances include one or more virtual machines (VMs) running on a hypervisor, the credit managers 130-132 are programs running on the hypervisor that adds/removes credits based on the activity of the VM. When a VM is launched, it is given an initial credit balance from the control plane 195 (e.g., based on a customer's profile and other factors). The credit manager 130-132 running on the hypervisor tracks credit usage and reports credit balances to the monitoring service 125 (e.g., Cloudwatch, which may also be running in the control plane). The credit tracker 205 on the credit-based load balancer 101 then periodically reads the current credit balances from the monitoring service 125 and updates the credit-based cache 200, so that the data is available to the load balancing engine 207.

In one embodiment, each compute engine 213-215 includes a virtually partitioned portion of a CPU (sometimes referred to as a virtual CPU or "vCPU") and/or one or more full CPUs. With this arrangement, each "credit" may be defined based on the usage of a vCPU or CPU over a specified period of time. For example, one credit may be equal to one vCPU running at 100% utilization for one minute or one vCPU running at 50% utilization for two minutes.

As mentioned, the control plane service 195 allocates each instance 110-112 an initial CPU credit balance based on the characteristics of the instance (e.g., processing requirements and/or size), the identity of the customer account, and/or other variables. In one embodiment, credit managers 130-132, which may be running on the hypervisor hosting the instances' virtual machine(s) (VMs), then continuously (e.g., at a millisecond-level resolution) or periodically allocate a specified number of credits over time (e.g., at a set rate of credits per hour), which may depend on the instance characteristics. Thus, in this embodiment, the credit manager 130-132 on each server hosting instance 110-112 (a secure component running on the instance's hypervisor) tracks its instance's credit balance and provides periodic/dynamic updates to the monitoring service 125. In this embodiment, the credit managers 130-132 subtract a number of credits from each instance's credit balance in response to the compute operations performed by the instances and provide an updated credit balance to the monitoring service 125 (and, ultimately to the credit tracker 205 as described herein).

When an instance uses fewer vCPU/CPU resources than its base performance level allows, such as when it is idle for a period of time, the unused credits (or the difference between what was earned and what was spent) are accumulated by the credit managers 130-132 and stored in the credit-based cache 200. These accumulated credits may be maintained for a period of time (e.g., up to 24 hours, a week, a year, indefinitely, etc.), thereby building up a credit balance for certain instances 110-112. The accumulated credits of each instance may then be evaluated by the load balancing engine 207 to determine where to forward compute requests which require processing bursts (i.e., requiring processing above a defined threshold). For example, if a particular instance 110 has accumulated a significant number of current credits relative to other instances 111-112, then the load balancing engine 207 may select this instance for a processing burst, all other variables being equal.

As mentioned, the monitors 120-122 collect data processing metrics for each instance 110-112, respectively. The data processing metrics may include, for example, the number of credits consumed by each instance 110-112, the processing load on each of the compute engines 113-115 (e.g., as measured over a period of time such as 10 seconds, one minute, etc.), and other data relevant to load balancing decisions (e.g., such as the "health" or reliability of each of the instances 110-112). In one embodiment, the monitors 120-122 are software components (e.g., processes, applications, etc.) of a larger, distributed monitoring and management system such as Cloudwatch, which collects relevant data and implements management functions for all or a defined subset of the network components of the system (e.g., such as the credit-based load balancer 101 and instances 110-112). In one implementation, the components of the monitoring and management system such as the monitors 120-122 and credit managers 130-132 may be implemented as secure components running directly on the hypervisors of their respective servers that host instances 110-112. While not illustrated in FIG. 2A for simplicity, another monitor may be associated and/or executed on the credit-based load balancer 101. Moreover, the monitors 120-122, respectively, may (or may not) be executed on the same hardware as that used by the instances 110-112.

In one embodiment, the load balancing engine 207 reads the data processing metrics collected from each instance 110-112 (e.g., from storage/memory) and renders load balancing decisions based on its evaluation of the data processing metrics (or portion thereof). For example, if a particular compute engine 213 is currently overloaded and/or is not processing compute requests efficiently, the load balancing engine 207 may choose to distribute a particular compute request 261-263 to a different compute engine 214, notwithstanding the relative credit balances of the different instances 110 and 111, respectively. Similarly, if a monitor 120 has just reported that a significant portion of the credits of its associated instance 110 have been consumed over a relatively short period of time (e.g., 5 seconds, 10 seconds, 1 minute, etc.), then the load balancing engine 207 will evaluate this data to determine the total credit balance for this instance 110 as well as credit balance trending data.

Figure 3:
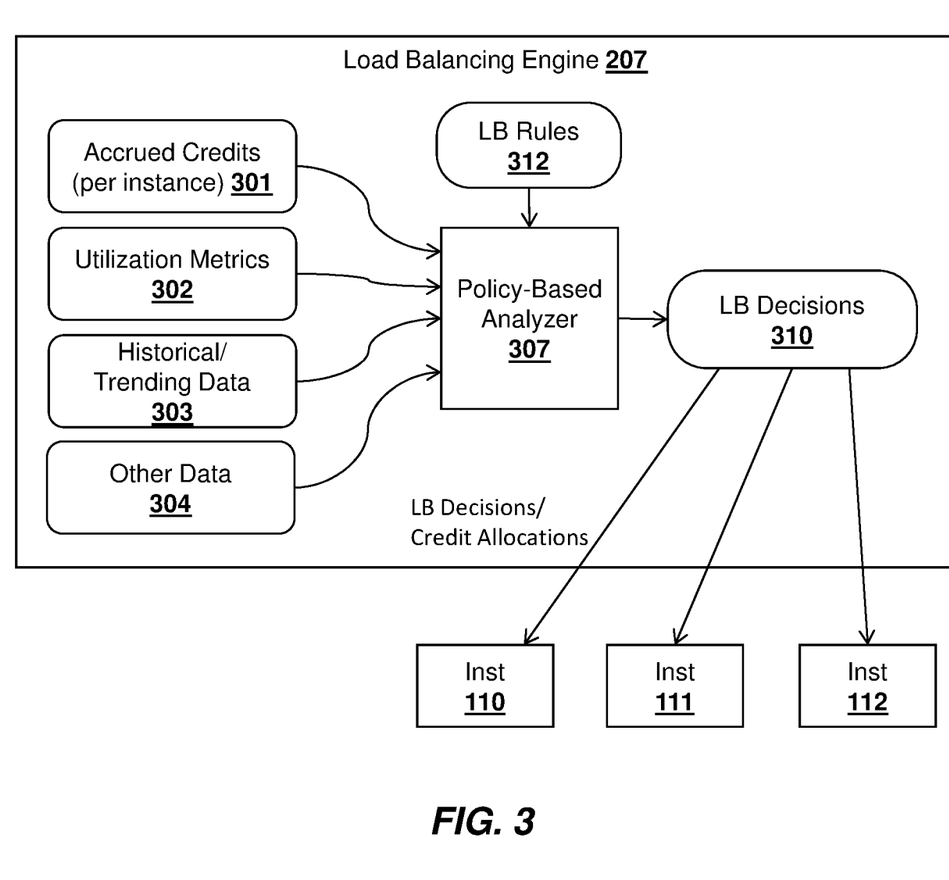
FIG. 3 illustrates one embodiment of a load balancing engine and data used by the load balancing engine.

In one embodiment, the credit-based load balancing techniques described herein may be integrated into any load balancing system, using credits as one of several factors to be considered (see, e.g., FIG. 3 and associated text where accrued credits 301 is one of several variables considered by a policy-based analyzer of the load balancer). In one embodiment, the credit-based evaluation may be used as a first pass filter to an existing load balancing algorithm. For example, all instances with credit balances below a specified threshold may be removed from consideration. A load balancing evaluation may then be performed to select from the remaining instances (e.g., a round-robin implementation, a workload-based policy, based on the health of the instances, etc).

Figure 2B:
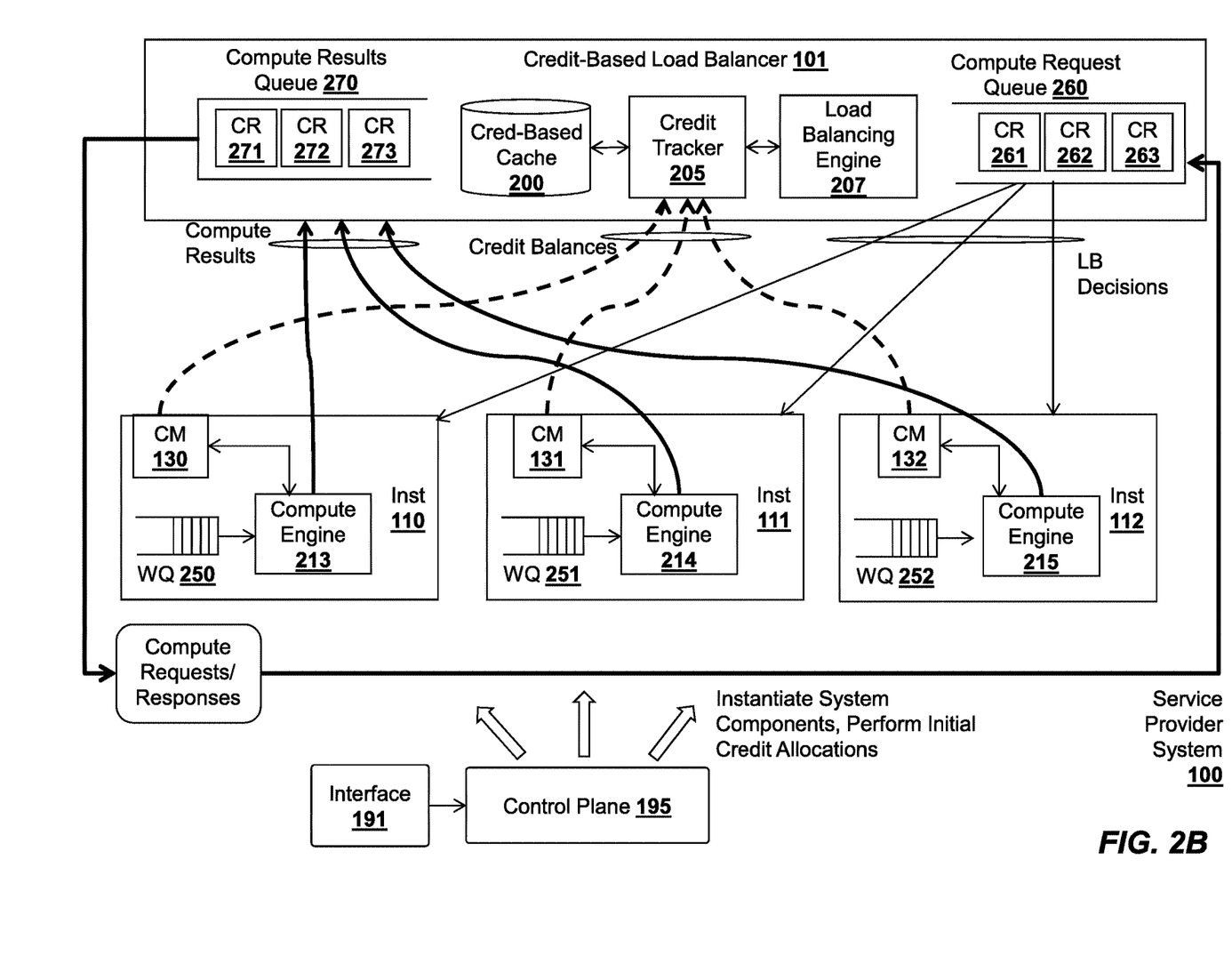

FIG. 2B illustrates an embodiment which does not rely on a separate monitoring service to provide data processing metrics to the credit-based load balancer 101. Rather, in this embodiment, the credit managers 130-132 subtract a number of credits from each instance's credit balance in response to the compute operations performed by the instances and provide an updated credit balance directly to the credit tracker 205. In this embodiment, to ensure a highly secure environment, the credit managers 130-132 are executed directly on the hypervisor of each server hosting instance 110-112 and the credit tracker 205 is executed directly on the hypervisor of the credit based load balancer 101.

As illustrated in FIG. 3, one embodiment of the load balancing engine 207 includes a policy-based analyzer 307 which renders load balancing decisions and/or performs credit allocations 310 to instances 110-112 based on one or more different types of input data 301-304. The particular types of input data and the manner in which the input data is weighted by the policy-based analyzer 307 may be specified in a set of programmable load balancing rules 312 which may be updated manually (e.g., by a programmer or system user) or automatically (e.g., using machine-learning or other form of automated knowledge gathering program code). In one embodiment, a customer can also select the algorithm used by the policy-based analyzer 307 via an API.

As described above, one implementation of the policy-based analyzer 307 renders load balancing decisions/credit allocations 310 based on the current accrued credit balance 301 of each of the instances 110-112. For example, the policy-based analyzer 307 may allocate compute requests for enhanced processing or "burst" capabilities to those instances with relatively higher credit balances. Here, "relatively higher" can mean above a threshold and/or higher relative to other instances. For example, in one embodiment, only those instances 110-112 with credit balances above a defined threshold are considered. Of this group, the relative credit balances of the instances 110-112 are evaluated (e.g., selecting an instance with the highest relative credit balance, which is also above the defined threshold). Of course, the underlying principles of the embodiments described herein are not limited to any specific implementation with respect to credit balances.

The policy-based analyzer 307 may also factor in utilization metrics 302 to render load balancing decisions/credit allocations 310. The utilization metrics 302 may include, for example, the processing load on each of the instances 110-112 using metrics collected by the monitors 120-122. Using this data, the policy-based analyzer 307 may select one or more of the instances 110-112 for enhanced processing (e.g., a processing burst using accrued credits), as long as the current processing load on the one or more instances is below a threshold.

In addition, as mentioned above, one embodiment of the policy-based analyzer 307 analyzes historical/trending data 303 when rendering load balancing decisions/credit allocations 310. For example, the policy-based analyzer 307 may evaluate the most recent credit usage data for each instance (e.g., the last minute, 10 minutes, 20 minutes, etc.) to determine whether the instance's credit balance is trending upwards, downward, or is remaining flat. The policy-based analyzer 307 may then prioritize those instances which have a relatively higher accrued credit balance and for which there is an upward processing trend. For example, if first and second instances have the same number of credits, but the historical/trending data 303 indicates that the first is trending upwards and the second is trending downwards or remaining flat, then the policy-based analyzer 307 may prioritize the first instance ahead of the second instance.

In addition, the historical/trending data 303 may, upon analysis, indicate a periodic processing schedule observed to occur on certain instances over time. For example, if a certain instance is determined to perform a significant percentage of its compute operations during a particular period of the day (or week, month, etc), then the policy-based analyzer 307 may perform load balancing in view of this anticipated need (e.g., balancing compute requests away from this particular instance prior to the designated period so that the instance will have the necessary credits). In an embodiment in which the instances 110-112 themselves perform the credit allocations, then they may do so in accordance with the anticipated schedule.

As indicated in FIG. 3, a variety of other types of data 304 may be evaluated by the policy-based analyzer 307 to render load balancing decisions/credit allocations 310. This additional data 304 may include runtime data collected by the monitors 120-122 during operation of the instances 110-112 such as data related to the health and/or reliability of each of the instances 110-112. The policy-based analyzer 307, in accordance with the load balancing rules 310, may then factor in this data when rendering load balancing decisions. By way of example, a particular instance may be operating at lower than expected performance, a higher than expected temperature, and/or may be generating data errors at a relatively higher rate. As such, the policy-based analyzer 307 may assign this instance a lower priority in favor of other instances, notwithstanding the instance's credit balance 301, utilization metrics 302, and/or historical trending data 303. Similarly, the other data 304 may include an indication of the number of times the instance has required re-initialization (providing an indication of reliability), the types of data processing jobs the instance is uniquely configured to process (e.g., based on the existence or lack of an accelerator device included in the instance), the specific configuration settings and/or hardware/software configuration of the instance, and/or any other data which may be pertinent to rendering load balancing decisions.

In one embodiment, the additional data 304 factored into the load balancing decisions 310 may also include an estimate of the cost of each incoming compute request. This may involve an analysis of the content of the compute request to determine the number of vCPU cycles are required and/or an analysis of historical data (e.g., prior similar compute requests) to determine the number of credits which will be consumed by each request.

In one embodiment, the load balancing decisions/credit allocations 310 are implemented as a priority queue (e.g., using a designated region of memory within the load balancing engine 107). The priority queue may comprise a prioritized list of all instances and the next instance to be allocated credit for a processing burst may be selected from the top of the list. Alternatively, the priority queue may include only those instances which are prioritized above all other instances (which are not included in the priority queue). Of course, instance prioritization may be implemented in a variety of ways while still complying with the underlying principles of the described embodiments.

Figure 4:
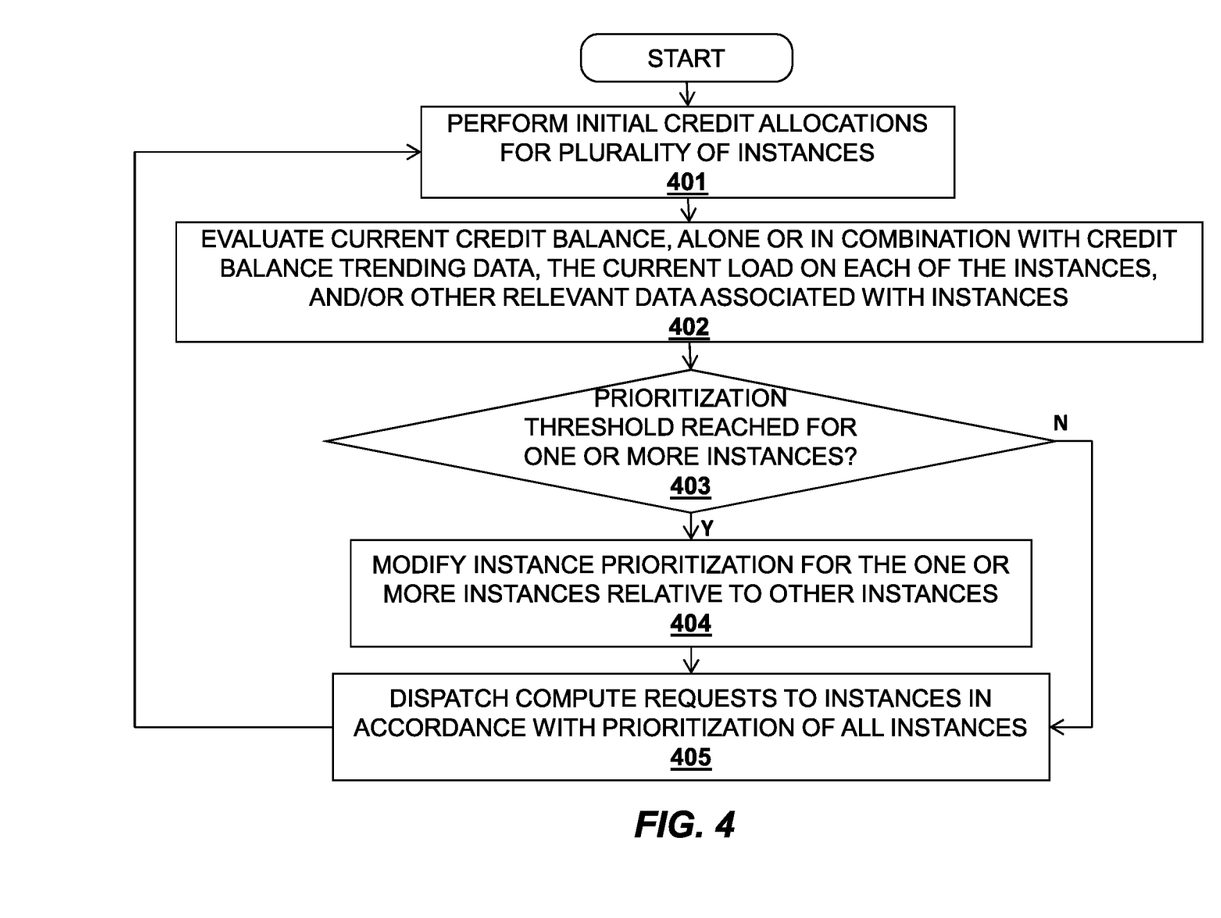
FIG. 4 illustrates one embodiment of a process for implementing credit-based load balancing.

FIG. 4 illustrates one embodiment of a machine-implemented process for credit-based load balancing. The process may be implemented within one or more of the architectural components illustrated in FIGS. 1-2. For example, in one embodiment, the illustrated operations may be performed by the credit-based load balancer 101 discussed above. It should be noted, however, that the process in FIG. 4 is not limited to any particular system, machine, or processor architecture.

At 401, initial credit allocations are performed for a plurality of instances. In one embodiment, the initial credit allocations are determined in view of the level of service guaranteed to the users/customers for which the instances are deployed. Other variables may be considered when performing the initial credit allocations such as the processing capabilities of each of the instances and/or the overall current or anticipated load on the system. As mentioned, in one embodiment, the initial credit allocations are made by a control plane service that sends a command to the servers hosting the instances to set the initial credit allocation for newly launched instances and subsequent credit adjustments are performed by programs running on the hypervisor or other management software used to host instances of the servers, which report their credit balances to the credit-based load balancer 101.

At 402, the credit balance of each instance is evaluated, either alone or in combination with other relevant data such as the credit balance trending data (described above) and/or the current workload on each instance. Based on the evaluation, if a prioritization threshold is reached for one or more instances, determined at 403, the relative prioritizations of the instances are modified at 404. For example, if the current credit balance of a first instance has reached a predetermined threshold, then the first instance may be moved ahead of a second instance with a lower credit balance. The "threshold" may specify a disparity in credit balances between instances. For example, if the difference between the credit balance of a first instance and the second instance rises above the specified threshold, then the priorities of the first and second instances may be swapped. In one embodiment, rather than maintaining a prioritized list of all instances, those instances who meet the threshold criteria may be placed in a "priority queue" from which the credit-based load balancer will select ahead of instances not in the priority queue. Various other prioritization techniques may be employed to favor instances which have relatively higher credit balances. Regardless of how the instances are prioritized, at 405, requests are dispatched to instances in accordance with the determined prioritization.

The operations illustrated in FIG. 4 may be performed in a different order than illustrated and, in one embodiment, are performed in parallel for multiple instances. For example, operations 402-404 may be performed simultaneously for multiple instances to reprioritize and/or fill the "high priority" queue. Moreover, one or more of the illustrated operations may be performed over a network using asynchronous, packet-based transactions between the instances 110-112 and the credit-based load balancer 101.

Figure 5:
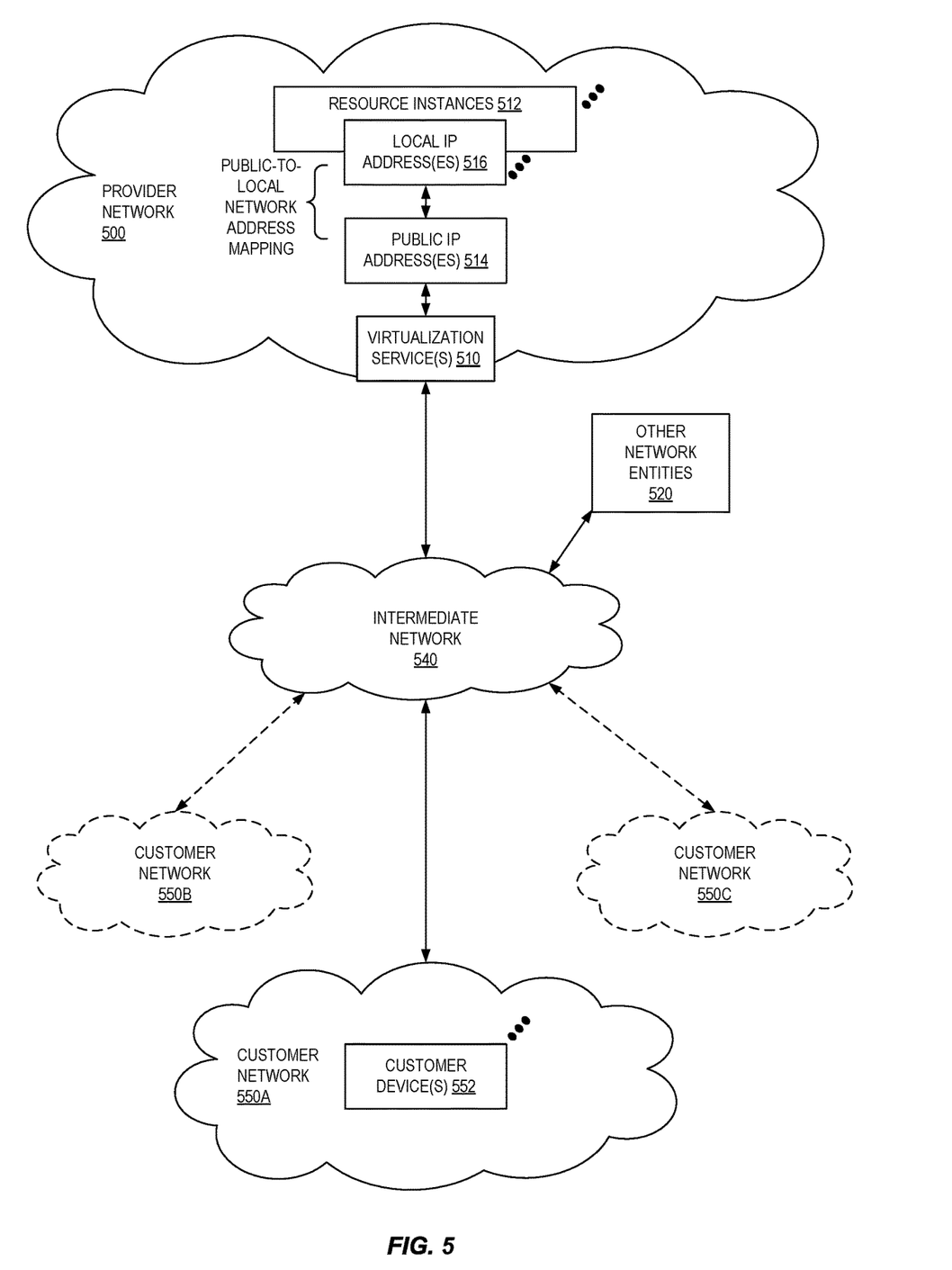
FIG. 5 illustrates an example provider network environment according to some embodiments.

FIG. 5 illustrates an example provider network (or "service provider system") environment according to some embodiments. A provider network 500 may provide resource virtualization to customers via one or more virtualization services 510 that allow customers to purchase, rent, or otherwise obtain instances 512 of virtualized resources, including but not limited to computation and storage resources, implemented on devices within the provider network or networks in one or more data centers. Local IP addresses 516 may be associated with the resource instances 512; the local IP addresses are the internal network addresses of the resource instances 512 on the provider network 500. In some embodiments, the provider network 500 may also provide public IP addresses 514 and/or public IP address ranges (for example, Internet Protocol version 4 (IPv4) or Internet Protocol version 6 (IPv6) addresses) that customers may obtain from the provider 500.

Conventionally, the provider network 500, via the virtualization services 510, may allow a customer of the service provider (for example, a customer that operates one or more client networks 550A-550C including one or more customer device(s) 552) to dynamically associate at least some public IP addresses 514 assigned or allocated to the customer with particular resource instances 512 assigned to the customer. The provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network(s) 550A-550C may, for example, implement customer-specific applications and present the customer's applications on an intermediate network 540, such as the Internet. Other network entities 520 on the intermediate network 540 may then generate traffic to a destination public IP address 514 published by the customer network(s) 550A-550C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 500; a customer may then assign their allocated public IP addresses to particular resource instances allocated to the customer. These public IP addresses may be referred to as customer public IP addresses, or simply customer IP addresses. Instead of being assigned by the provider network 500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
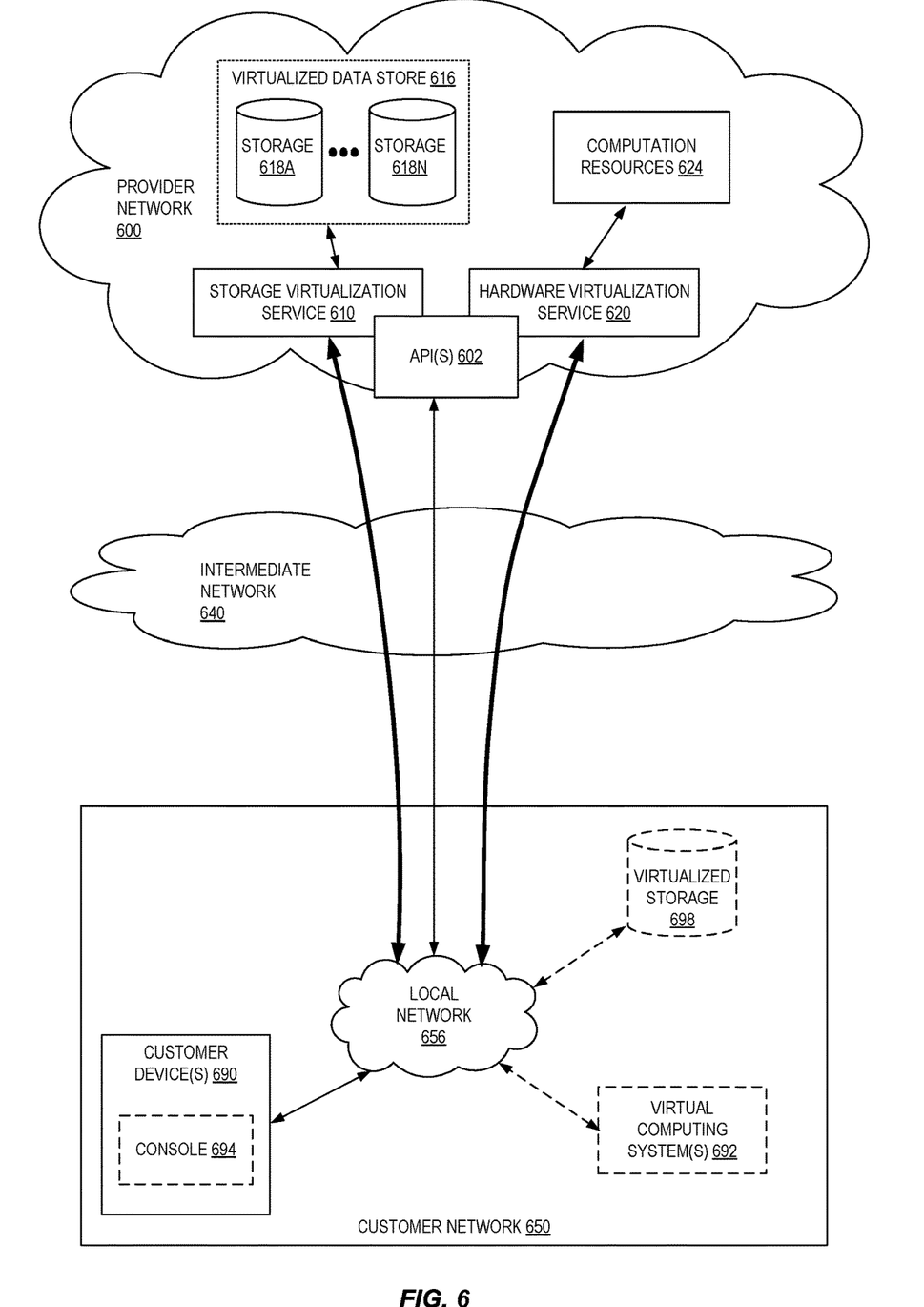
FIG. 6 is a block diagram of an example provider network that provides a storage virtualization service and a hardware virtualization service to customers according to some embodiments.

FIG. 6 is a block diagram of an example provider network that provides a storage virtualization service and a hardware virtualization service to customers, according to some embodiments. Hardware virtualization service 620 provides multiple computation resources 624 (for example, VMs) to customers. The computation resources 624 may, for example, be rented or leased to customers of the provider network 600 (for example, to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (for example, a web-based application, standalone application, mobile application, and so forth). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (for example, via console 694), the customer may access the functionality of storage virtualization service 610, for example via one or more APIs 602, to access data from and store data to storage resources 618A-618N of a virtual data store 616 provided by the provider network 600. In some embodiments, a virtualized data store gateway (not shown) may be provided at the customer network 650 that may locally cache at least some data, for example frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Figure 7:
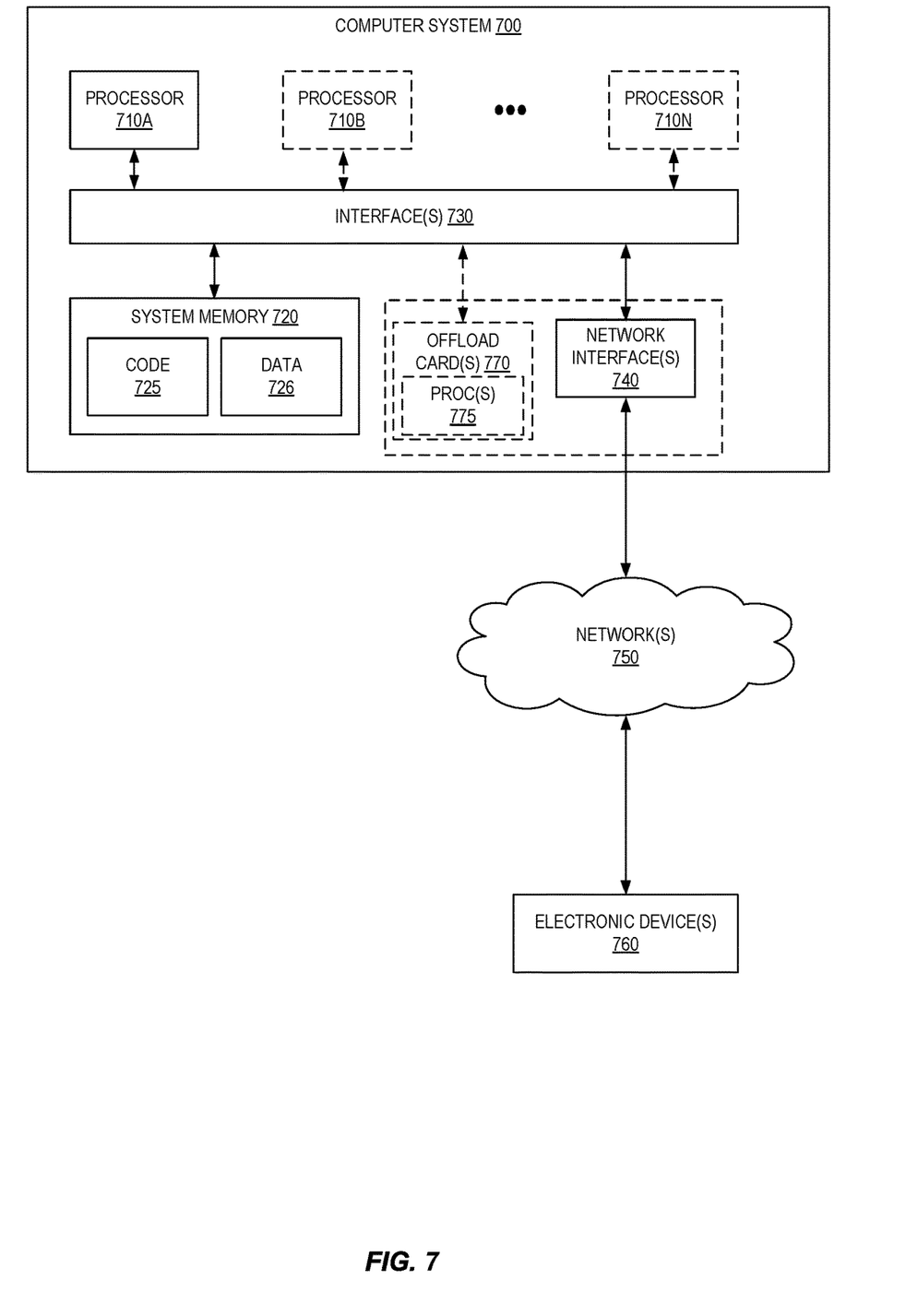
FIG. 7 is a block diagram illustrating an example computer system that may be used in some embodiments.

In some embodiments, a system that implements a portion or all of the techniques for credit-based load balancing as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (for example, two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (for example, system memory 720) into a format suitable for use by another component (for example, processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (for example, operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, and so forth These management operations may, in some embodiments, be performed by the offload card(s) 770 in coordination with a hypervisor (for example, upon a request from a hypervisor) that is executed by the other processors 710A-710N of the computer system 700. However, in some embodiments the virtualization manager implemented by the offload card(s) 770 can accommodate requests from other entities, and may not coordinate with (or service) any hypervisor.

Users of service provider systems may operate for the benefit of different entities. An entity may be a formal or informal organization such as a business, non-profit, governmental unit, educational group, shared-interest group, union, collective, etc., and thus the user may act on behalf of (or as part of) the entity. However, an entity may also be an individual person. Within the context of the service provider system, an entity may establish an account (or possibly multiple accounts), where each account is associated with one or more users (or "user accounts").

In some embodiments, system memory 720 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 700 via I/O interface 730. A non-transitory computer-accessible storage medium may also include any volatile or non-volatile media such as RAM (for example, SDRAM, double data rate (DDR) SDRAM, SRAM, and so forth), read only memory (ROM), and so forth, that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, for example, disk or DVD/CD-ROM, volatile or non-volatile media such as RAM (for example, SDRAM, DDR, RDRAM, SRAM, and so forth), or ROM, as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 550A-C) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   allocating, by a control plane service, a resource credit balance to each of a plurality of compute instances based at least in part on a service characteristic associated with the corresponding compute instance, each compute instance comprising a processor, each resource credit balance to have credit deducted upon an associated compute instance performing a processing operation on the processor and a specified number of resource credits added to the resource credit balance at specified, regular time intervals, wherein one resource credit comprises a corresponding resource of a compute instance running at full utilization for a first period of time or running at half utilization for two times the first period of time;
   receiving, by a load balancer, a request from one or more clients;
   evaluating, by the load balancer, a current resource credit balance for each of the plurality of compute instances and resource credit balance trending data for each of the plurality of compute instances, the resource credit balance trending data indicating a rate at which the resource credit balance is changing over a specified period of time; and
   selecting, by the load balancer, a compute instance from the plurality of compute instances to handle the request based at least in part on a ranking of the current resource credit balance for each of the plurality of compute instances and the resource credit balance trending data for each of the plurality of compute instances.

2. The computer-implemented method of claim 1 wherein evaluating further comprises:
   determining a prioritization value for each compute instance using a weighted combination of the current resource credit balance and the resource credit balance trending data, wherein the ranking is based at least in part on the prioritization value for each compute instance.

3. The computer-implemented method of claim 2 wherein a relatively larger resource credit balance is to result in a relatively higher priority, all other variables being equal.

4. A computer-implemented method comprising:
   determining, by a load balancer, a plurality of current resource credit balances, each current resource credit balance corresponding to a compute instance of a plurality of compute instances, each compute instance allocated an initial resource credit balance based at least in part on a service characteristic associated with the corresponding compute instance, each compute instance to consume credits from its respective resource credit balance in response to performance of specified data processing operations, the resource credit balance of each compute instance to be increased by a corresponding specified number of resource credits at specified, regular time intervals, wherein one resource credit comprises a corresponding resource of a compute instance running at full utilization for a first period of time or running at half utilization for two times the first period of time;
   receiving, by the load balancer, a request;
   selecting, by the load balancer, one of the compute instances to be a destination for the request based at least in part on a ranking of the plurality of current resource credit balances and resource credit balance trending data for each of the plurality of compute instances, the resource credit balance trending data indicating a rate at which the resource credit balance is changing over a specified period of time; and
   transmitting, by the load balancer, the request to the selected compute instance.

5. The computer-implemented method of claim 4 further comprising:
prioritizing the plurality of compute instances for receiving requests using a weighted combination of the current resource credit balances and resource credit trending data for each of the compute instances, wherein the ranking based on the prioritization.

6. The computer-implemented method of claim 4 wherein a first compute instance of the plurality of compute instances comprises a virtualized set of execution resources including at least a first virtualized portion of a processor and a first virtualized portion of a memory.

7. The computer-implemented method of claim 6 wherein one resource credit comprises a virtual processor running at full utilization for one minute or a virtual processor running at half utilization for two minutes.

8. The computer-implemented method of claim 6 further comprising:
determining a prioritization value for each compute instance using a weighted combination of the current resource credit balance and the resource credit balance trending data.

9. The computer-implemented method of claim 8 wherein an increasing resource credit balance is to result in a relatively higher priority, all other variables being equal.

10. The computer-implemented method of claim 8 wherein a decreasing resource credit balance is to result in a relatively lower priority, all other variables being equal.

11. The computer-implemented method of claim 4 further comprising:
provisioning the load balancer in response to a request from a customer of a service provider, wherein the plurality of compute instances are hosted by servers operated by the service provider.

12. The computer-implemented method of claim 5 wherein the ranking is further based on utilization metrics for each of the plurality of compute instances and/or other data related to operation of the plurality of compute instances.

13. A system comprising:
a first one or more electronic devices to implement a plurality of compute instances, each compute instance allocated an initial resource credit balance, the resource credit balance to be stored in a credit data store as a current resource credit balance, each compute instance to consume credits from its respective resource credit balance when its virtual processor runs, each resource credit balance to be increased by a corresponding specified number of resource credits at specified, regular time intervals, wherein one resource credit comprises a corresponding resource of a compute instance running at full utilization for a first period of time or running at half utilization for two times the first period of time;
a second one or more electronic devices to implement a credit-based load balancer and including instructions that upon execution cause the credit-based load balancer to:
determine the current resource credit balance for each of the plurality of compute instances;
rank in priority the plurality of compute instances to process requests from clients based at least in part on relative current resource credit balances of each of the compute instances and resource credit balance trending data indicating a rate at which the resource credit balances are changing over a specified period of time; and
store in a prioritization queue a priority of each of the plurality of compute instances.

14. The system of claim 13 further comprising:
an application programming interface (API) to receive a request from a customer to provision the credit-based load balancer to perform load balancing operations; and
a credit manager to deduct resource credit from the resource credit balance of a respective compute instance responsive to a virtual processor of the compute instance running.

15. The system of claim 13 wherein the credit-based load balancer is to forward a new client request to a first compute instance based on the first compute instance having a highest priority relative to other compute instances.

16. The system of claim 13 wherein a first compute instance of the plurality of compute instances comprises a virtualized set of execution resources including at least a first virtualized portion of a processor and a first virtualized portion of a memory.

17. The system of claim 16 wherein a resource credit comprises a virtual processor running at full utilization for one minute or a virtual processor running at half utilization for two minutes.

18. The system of claim 14 wherein a first compute instance of the plurality of compute instances comprises a hypervisor on which one or more virtual machines (VMs) are executed, wherein the credit manager is to be executed directly on the hypervisor to deduct the resource credit from the resource credit balance responsive to the virtual processor of the compute instance running.

* * * * *